United States Patent [19]

Hirukawa et al.

[11] Patent Number: 4,470,341
[45] Date of Patent: Sep. 11, 1984

[54] AIR INTAKE DEVICE FOR A COMPARTMENT OF AUTOMOTIVE VEHICLE

[75] Inventors: Masahiko Hirukawa; Kiyokazu Seo, both of Toyota; Tadashi Shimizu, Aichi, all of Japan

[73] Assignee: Toyota Jidosha Kabushiki Kaisha, Toyota, Japan

[21] Appl. No.: 467,175

[22] Filed: Feb. 16, 1983

[30] Foreign Application Priority Data

Mar. 23, 1982 [JP] Japan ................................ 57-046585

[51] Int. Cl.³ .............................................. B60H 1/00
[52] U.S. Cl. ........................................... 98/2.16; 98/2
[58] Field of Search ...................... 98/2.16, 2.17, 2.19, 98/2

[56] References Cited

U.S. PATENT DOCUMENTS 2,730,032  1/1956  Greenmun ................................. 98/2
2,888,274  5/1959  Premo .................................... 98/2 X
4,385,549  5/1983  Bauer et al. ............................... 98/2

Primary Examiner—William E. Wayner
Assistant Examiner—J. Sollecito
Attorney, Agent, or Firm—Oblon, Fisher, Spivak, McClelland & Maier

[57] ABSTRACT

Disclosed herein is an air intake device for a compartment of automotive vehicle provided with a transversely elongated space between a rear end portion of an engine hood panel and a substantially horizontal plate of a cowl outer panel for inducing air to a compartment therefrom. The improvement comprises a windshield lower moulding plate arranged above the horizontal plate of the cowl outer panel in such a manner that it strides across a lower end portion of a windshield glass and extends transversely from one of fender panels of the vehicle to another, a second tube provided between the windshield lower moulding plate and the horizontal plate of the cowl outer panel to communicate with first tubes defined inside of the fender panels and an air inducing aperture opened through the horizontal plate covered with the windshield lower moulding plate. With this arrangement, even when the space is covered with snow, the second tube and the air inducing apertures are prevented from being blocked by snow and accordingly, air may be readily induced to the compartment.

23 Claims, 3 Drawing Figures

AIR INTAKE DEVICE FOR A COMPARTMENT OF AUTOMOTIVE VEHICLE

BACKGROUND OF THE INVENTION

This invention relates to an air intake device for a compartment of automotive vehicle.

Conventionally, in some automotive vehicles provided with a transversely elongated space between the rear end portion of an engine hood panel and the upper portion of a cowl outer panel for receiving the base portion of a windshield wiper, a wiper arm and a wiper blade therein, air is induced from the space through a cowl ventilator louver mounted on the upper portion of the cowl outer panel and vent holes opened through the upper portion of the cowl outer panel toward a cowl chamber provided between the cowl outer panel and the cowl inner panel, and is in turn induced to the compartment of the vehicle. A windshield lower moulding is located adjacent to the cowl ventilator louver so as to stride across the lower end portion of a windshield glass which is bonded to the upper portion of the cowl outer panel by adhesive. However, in such a conventional device, when the space is covered with snow, the cowl ventilator louver is blocked by the snow, thereby hindering air from being induced to the compartment.

SUMMARY OF THE INVENTION

Accordingly, an object of the present invention is to provide an air intake device for a compartment of automotive vehicle which may readily induce air to the compartment of the vehicle even when the space is covered with snow.

According to the present invention, in an automotive vehicle provided with a transversely elongated space between the rear end portion of the engine hood panel and the substantially horizontal plate of the cowl outer panel for inducing air to the compartment therefrom, a windshield lower moulding plate is arranged above the horizontal plate of the cowl outer panel in such a manner that it strides across the lower end portion of a windshield glass and extends transversely from one of fender panels of the vehicle to another, and thereby providing a second tube between the windshield lower moulding plate and the horizontal plate of the cowl outer panel to communicate with first tubes defined inside of the fender panels. Air inducing apertures are opened through the horizontal plate of the cowl outer panel covered with the windshield lower moulding plate. With this arrangement, even when snow falls, the first tubes inside of the fender panels, the third tube between the windshield lower moulding plate and the horizontal plate of the cowl outer panel, and the air inducing apertures are prevented from being blocked by snow and accordingly, air may be readily induced to the compartment. Moreover, the device according to the present invention is simple and easily applicable, thus attaining the above mentioned effect with reduced costs.

Various general and specific objects, advantages and aspects of the invention will become apparent when reference is made to the following detailed description of the invention considered in conjunction with the related accompanying drawings. BRIEF DESCRIPTION OF THE DRAWINGS FIG. 1 is a perspective view of a preferred embodiment according to the invention;

DETAILED DESCRIPTION OF THE PREFERRED EMBODIMENTS

Figure 1:
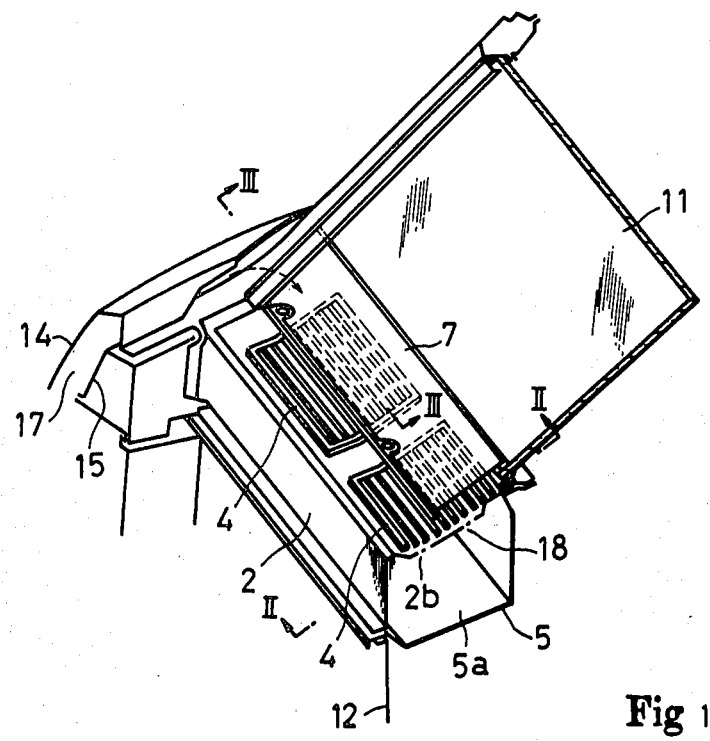
Figure 2:
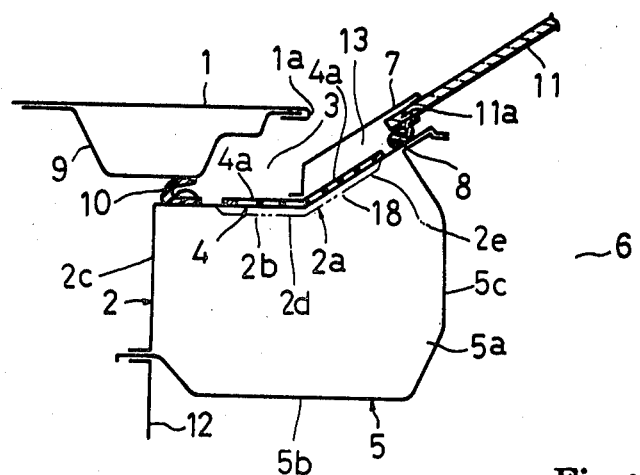
FIG. 2 is a cross-sectional view taken along the line II—II in FIG. 1.
Figure 3:
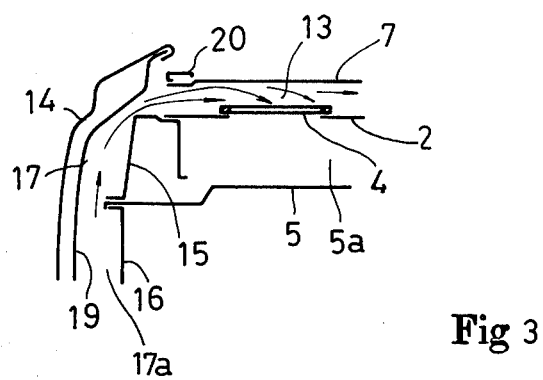
FIG. 3 is a cross-sectional view taken along the line III—III in FIG. 1.

Referring now to FIGS. 1 to 3, a transversely elongated space 3 is provided between the rear end portion 1a of an engine hood panel 1 and the substantially horizontal plate 2a of a cowl outer panel 2. A cowl top side panel 15 and a cowl lower side panel 16 are spaced from each interior surface of fender panels 14 and forms first tubes 17 having each lower opening 17a with the fender panels 14. A cowl outer panel 2 is located on the top end of the cowl top side panel 15 and extends transversely from one of the cowl top side panels 15 to another. The cowl outer panel 2 is constructed of a vertical wall 2c and a substantially horizontal plate 2a extending rearwardly from the top end of the vertical wall 2c. The horizontal plate 2a is consisted of a front horizontal portion 2d and a rear inclined portion 2e.

Air is induced from the space 3 through a cowl ventilator louver 4 having a lot of slits 4a and mounted on the horizontal plate 2a of the cowl outer panel 2 and apertures 2b opened through the horizontal plate 2a of the cowl outer panel 2 toward a third tube 5a provided between the cowl outer panel 2 and a cowl inner panel 5 located under and spaced from the cowl outer panel 2, and is in turn induced to a compartment 6 of the vehicle. The cowl inner panel 5 is consisted of a horizontal plate 5b extending from the lower end of the vertical wall 2c of the cowl outer panel 2 and a vertical wall 5c extending from the rear end of the horizontal plate 2a of the cowl outer panel 2.

A windshield lower moulding plate 7 is arranged above and spaced from the horizontal plate 2a of the cowl outer panel 2 in such a manner that it strides across the lower end portion 11a of a windshield glass 11, in other words, the windshield lower moulding plate 7 covers the lower end portion 11a of the windshield glass 11 and the rear inclined portion 2e of the cowl outer panel 2, and extends transversely from one of the fender panels 14 to another, and thereby providing a second tube 13 between the windshield lower moulding plate 7 and the horizontal plate 2a of the cowl outer panel 2. The second tube 13 extends in the lateral direction of an automotive body, and communicates with the first tubes 17 defined between each fender panel 14, cowl top side panel 15 and cowl lower side panel 16.

A plurality of air inducing apertures 18 are opened through the horizontal plate 2a facing to the second tube 13 or covered by the windshield lower moulding plate 7, thereby communicating with the second tube 13 and the third tube 5a. The cowl ventilator louver 4 extends into the second tube 13.

Reference numeral 9 shows an inner panel of the engine hood, and 10 shows a sealing rubber provided between the inner panel 9 and the cowl outer panel 2. Reference numerals 12, 19 and 20 designate a dash panel, a fender reinforcement for reinforcing the rear portion of the front fender and a front pillar side moulding, respectively.

In operation, even when the apertures 2b of the cowl ventilator louver 4 are blocked by the snow accumulated in the space 3, air may be induced from the first tube 17 inside of the fender panels 14 through the second tube 13, the cowl ventilator louver 4 facing to the second tube 13 and the air inducing apertures 18 of the horizontal plate 2a to the third tube 5a, and is in turn induced to the compartment 6.

Having thus described the preferred embodiment of the invention it should be understood that numerous structural modifications and adaptations may be restored to without departing from the spirit of the invention.

What is claimed is:

1. An air intake device for a compartment of automotive vehicle comprising:
   fender panels forming both side-exterior surfaces and located in front of doors of said vehicle;
   a cowl side panel spaced from an interior surface of one of said fender panels and forming a first tube with said fender panel;
   a cowl outer panel located on the top end of said cowl side panel and extending transversely from said cowl side panel to another of said fender panels;
   a windshield lower moulding plate located above and spaced from said cowl outer panel and forming a second tube communicating with said first tube; and
   at least one aperture formed in said cowl outer panel, whereby air is sucked into the compartment through said first tube, said second tube and said aperture.

2. The device as claimed in claim 1, wherein said first tube has at least one lower opening.

3. The device as claimed in claim 1, wherein said cowl side panel has a cowl lower side panel and a cowl top side panel located on the cowl lower side panel.

4. An air intake device for a compartment of automotive vehicle comprising:
   fender panels forming both side-exterior surfaces and located in front of doors of said vehicle;
   cowl side panels spaced from each interior surface of both of said fender panels and forming two first tubes with said fender panels;
   a cowl outer panel located on the top ends of said cowl side panels and extending transversely from one of said cowl side panels to another of said cowl side panels;
   a windshield lower moulding plate located above and spaced from said cowl outer panel and forming a second tube communicating with said both two first tubes; and
   at least one aperture formed in said cowl outer panel, whereby air flows into the compartment through said two first tubes, said second tube and said air inducing aperture.

5. The device as claimed in claim 4, wherein said each first tube has at least one lower opening.

6. The device as claimed in claim 4, wherein said cowl side panel is comprised of a cowl lower side panel and a cowl top side panel located on the cowl lower side panel.

7. The device as claimed in claim 4, wherein said cowl outer panel has a first vertical wall and a second horizontal plate extending rearwardly from the top end of said first vertical wall.

8. The device as claimed in claim 7, wherein said second horizontal plate has a front horizontal portion and rear inclined portion.

9. The device as claimed in claim 8, wherein said aperture is opened on the rear inclined portion of said cowl outer panel.

10. The device as claimed in claim 8, wherein said aperture is formed in the front horizontal portion and the rear inclined portion of said cowl outer panel.

11. The device as claimed in claim 10, further comprising a cowl ventilator louver covering over said aperture.

12. The device as claimed in claim 11, wherein said cowl ventilator louver has a lot of slits.

13. The device as claimed in claim 11, further comprising a windshield glass located on the rear end of said cowl outer panel.

14. The device as claimed in claim 13, wherein said windshield lower moulding plate covers the lower end of said windshield glass and the rear inclined portion and the front horizontal portion of said cowl outer panel.

15. The device as claimed in claim 13, wherein said windshield lower moulding plate covers the rear inclined portion and the front horizontal portion of said cowl outer panel.

16. The device as claimed in claim 13, wherein said windshield lower moulding plate covers the lower end of said windshield glass and the rear inclined portion of said cowl outer panel.

17. The device as claimed in claim 16, wherein said windshield lower moulding plate has the front end located on said cowl ventilator louver and the rear end lcoated on the lower end of said windshield glass.

18. The device as claimed in claim 13, further comprising a cowl inner panel located under and spaced from said cowl outer panel, and forming a third tube.

19. The device as claimed in claim 18, wherein said cowl inner panel has a third horizontal plate extending from the lower end of said first vertical wall of said cowl outer panel and a fourth vertical wall extending from the rear end of said third horizontal plate.

20. An air intake device for a compartment of automotive vehicle comprising:
   fender panels forming both side-exterior surfaces and located in front of doors of said vehicles;
   cowl side panels spaced from each interior surface of both of said fender panels and forming two first tubes with said fender panels;
   a cowl outer panel located on the top ends of said cowl side panels and extending transversely from one of said cowl side panels to another further comprising a front horizontal portion, a rear inclined portion and at least one aperture formed in said cowl outer panel and extending over said front horizontal portion and said rear inclined portion; and
   a windshield lower moulding plate located above and spaced from said rear inclined portion of said cowl outer panel and forming a second tube communicating with at least one of said two first tubes.

21. The device as claimed in claim 20, wherein said cowl side panel is constructed of a cowl lower side panel and a cowl top side panel arranged on the cowl lower side panel.

22. The device as claimed in claim 20, further comprising a cowl ventilator louver covering over said aperture.

23. The device as claimed in claim 22, wherein said cowl ventilator louver has a lot of slits.

* * * * *